US009087315B1

(12) United States Patent
Meyers (10) Patent No.: US 9,087,315 B1
(45) Date of Patent: Jul. 21, 2015

(54) METHOD AND APPARATUS FOR A HANDHELD TERMINAL AND APPLICATIONS FOR IMPLEMENTATION OF SECURE AUTHORIZATION FOR HANDLING FREIGHT

(75) Inventor: Richard C. Meyers, Longboat Key, FL (US)

(73) Assignee: GlobalTrak LLC, Dulles, VA (US)

( * ) Notice: Subject to any disclaimer, the term of this patent is extended or adjusted under 35 U.S.C. 154(b) by 210 days.

(21) Appl. No.: 13/439,884

(22) Filed: Apr. 5, 2012

Related U.S. Application Data (60) Provisional application No. 61/471,794, filed on Apr. 5, 2011.

(51) Int. Cl.

| | |
|---|---|
| G06F 7/00 | (2006.01) |
| G06F 19/00 | (2011.01) |
| G06Q 30/00 | (2012.01) |
| G06Q 90/00 | (2006.01) |
| G06K 7/00 | (2006.01) |
| G06K 7/08 | (2006.01) |
| G05B 19/00 | (2006.01) |
| G08B 13/14 | (2006.01) |
| G08B 1/08 | (2006.01) |
| B60R 25/10 | (2013.01) |
| G06Q 10/08 | (2012.01) |
| G06Q 20/20 | (2012.01) |

(52) U.S. Cl.
CPC .............. G06Q 10/087 (2013.01); G06Q 10/08 (2013.01); G06Q 20/203 (2013.01)

(58) Field of Classification Search
USPC ................. 235/385, 435, 449, 451; 340/5.92, 340/572.1, 426.19, 539.13
See application file for complete search history.

(56) References Cited

U.S. PATENT DOCUMENTS

| | | | | |
|---|---|---|---|---|
| 7,273,172 | B2 * | 9/2007 | Olsen et al. | 235/385 |
| 7,339,469 | B2 * | 3/2008 | Braun | 340/539.13 |
| 7,623,029 | B2 * | 11/2009 | Meyers | 340/539.13 |
| 7,868,753 | B2 * | 1/2011 | Jenkins et al. | 340/539.13 |
| 8,154,397 | B2 * | 4/2012 | Astrin | 340/505 |
| 2002/0089434 | A1 * | 7/2002 | Ghazarian | 340/988 |
| 2003/0114206 | A1 * | 6/2003 | Timothy et al. | 455/575 |
| 2003/0179073 | A1 * | 9/2003 | Ghazarian | 340/5.6 |
| 2004/0041706 | A1 * | 3/2004 | Stratmoen et al. | 340/539.26 |
| 2004/0113786 | A1 * | 6/2004 | Maloney | 340/568.1 |
| 2004/0233041 | A1 * | 11/2004 | Bohman et al. | 340/10.1 |
| 2004/0257225 | A1 * | 12/2004 | Webb, Sr. | 340/539.26 |
| 2005/0061878 | A1 * | 3/2005 | Barenburg et al. | 235/385 |
| 2005/0073406 | A1 * | 4/2005 | Easley et al. | 340/539.1 |
| 2005/0080520 | A1 * | 4/2005 | Kline et al. | 701/1 |

(Continued)

*Primary Examiner* — Daniel Walsh (57) ABSTRACT

The present invention provides an apparatus that pairs a container monitoring system with a handheld terminal application for ensuring a secure and verifiable chain of custody, real-time asset tracking, and document management. According to one aspect of the present invention, the remote monitoring station verifies identification and licenses and oversees transferring container custody from agent to agent for each container unit. The present invention further provides a system to manage documentation in which information from multiple sensors and multiple shipments travel and arrive with the actual shipments allowing the user to collect, view, scan, transmit and print all pertinent information pertaining to each specific shipment. The present invention may be used in conjunction with the prior art and function as a universal open architecture capable of linking to, for example, existing container sensor systems and/or shipping document management systems.

6 Claims, 5 Drawing Sheets

(56) References Cited

U.S. PATENT DOCUMENTS

| | | | |
|---|---|---|---|
| 2005/0119786 A1* | 6/2005 | Kadaba | 700/224 |
| 2005/0119904 A1* | 6/2005 | Tissington et al. | 705/1 |
| 2005/0154527 A1* | 7/2005 | Ulrich | 701/207 |
| 2005/0197844 A1* | 9/2005 | Ng et al. | 705/1 |
| 2005/0248454 A1* | 11/2005 | Hanson et al. | 340/539.26 |
| 2006/0020498 A1* | 1/2006 | Aitipamula et al. | 705/7 |
| 2006/0020499 A1* | 1/2006 | Aitipamula et al. | 705/7 |
| 2006/0020527 A1* | 1/2006 | Bhally et al. | 705/35 |
| 2006/0020528 A1* | 1/2006 | Levenson et al. | 705/35 |
| 2006/0020529 A1* | 1/2006 | Chao et al. | 705/35 |
| 2006/0109106 A1* | 5/2006 | Braun | 340/539.13 |
| 2006/0158326 A1* | 7/2006 | Easley | 340/522 |
| 2006/0250235 A1* | 11/2006 | Astrin | 340/539.22 |
| 2006/0251498 A1* | 11/2006 | Buzzoni et al. | 414/139.9 |
| 2007/0013519 A1* | 1/2007 | Chung et al. | 340/572.1 |
| 2007/0118332 A1* | 5/2007 | Meyers et al. | 702/182 |
| 2007/0133980 A1* | 6/2007 | Meyers et al. | 396/429 |
| 2007/0152815 A1* | 7/2007 | Meyers et al. | 340/539.22 |
| 2008/0117040 A1* | 5/2008 | Peel et al. | 340/539.16 |
| 2009/0102653 A1* | 4/2009 | McGinnis et al. | 340/551 |
| 2009/0171500 A1* | 7/2009 | Matsumoto et al. | 700/217 |
| 2009/0322510 A1* | 12/2009 | Berger et al. | 340/539.1 |
| 2010/0057593 A1* | 3/2010 | Moir et al. | 705/29 |
| 2010/0072380 A1* | 3/2010 | Britton et al. | 250/370.07 |
| 2010/0328031 A1* | 12/2010 | Powers et al. | 340/5.64 |
| 2011/0017693 A1* | 1/2011 | Thomas et al. | 212/270 |
| 2012/0047085 A1* | 2/2012 | Naghshineh et al. | 705/333 |
| 2012/0092130 A1* | 4/2012 | Chung et al. | 340/10.1 |
| 2012/0112902 A1* | 5/2012 | Meyers | 340/539.1 |
| 2014/0009612 A1* | 1/2014 | King | 348/143 |

* cited by examiner

METHOD AND APPARATUS FOR A HANDHELD TERMINAL AND APPLICATIONS FOR IMPLEMENTATION OF SECURE AUTHORIZATION FOR HANDLING FREIGHT

BACKGROUND AND FIELD OF THE PRESENT INVENTION

1. Field of the Present invention

The present invention relates generally to a secure system for tracking shipping containers, and more particularly, to a handheld terminal apparatus paired with shipping containers or ULD vehicles for providing a method for ensuring a secure chain of custody.

2. Background of the Invention

When shipping a product, the shipper must be aware of packing, labeling, documentation, and insurance requirements. In this environment, it is important that shippers ensure that the merchandise is packed correctly so that it arrives in good condition; labeled correctly to ensure that the goods are handled properly and arrive on time at the right place; documented correctly to meet U.S. and foreign government requirements as well as proper collection standards; and insured against damage, loss, and delay.

Most exporters rely on an international freight forwarder to perform these services because of the multitude of considerations involved in physically exporting goods. An international freight forwarder is an agent for the exporter in moving cargo to an overseas destination. These agents are familiar with the import rules and regulations of foreign countries, the export regulations of the U.S. government, the methods of shipping, and the documents related to foreign trade. Export freight forwarders are licensed by the International Air Transport Association (IATA) to handle air freight and the Federal Maritime Commission to handle ocean freight.

Freight forwarders assist exporters in preparing price quotations by advising on freight costs, port charges, consular fees, costs of special documentation, insurance costs, and their handling fees. They recommend the packing methods that will protect the merchandise during transit or can arrange to have the merchandise packed at the port or containerized. If the exporter prefers, freight forwarders can reserve the necessary space on a vessel, aircraft, train, or truck.

Freight forwarders may also arrange with customs brokers overseas to ensure that the goods comply with customs export documentation regulations. A customs broker is an individual or company licensed to transact customs business on behalf of others. Customs business is limited to those activities involving transactions related to the entry and admissibility of merchandise; its classification and valuation; the payment of duties, taxes, or other charges assessed or collected; or the refund, rebate, or drawback thereof.

Documentation must be precise because slight discrepancies or omissions may prevent merchandise from being exported, result in nonpayment, or even result in the seizure of the exporter's goods by U.S. or foreign government customs. Collection documents are subject to precise time limits and may not be honored by a bank if the time has expired. Most documentation is routine for freight forwarders and customs brokers, but the exporter is ultimately responsible for the accuracy of its documents. The number and kind of documents the exporter must deal with varies depending on the destination of the shipment. Because each country has different import regulations, the exporter must be careful to provide all proper documentation.

Since the 9-11 terrorist attacks, a strong emphasis has been placed on studying the security threat to the U.S. by way of the estimated 6-12 million containers entering and reentering the U.S. each year. The 2002 Container Security Initiative (CSI) called for significant improvements in this area of security as it pertains to Intermodal shipping, port inspections and container monitoring. The most promising innovations for container security systems lay in the development of smart containers.

A smart container monitoring system includes a sensing system for monitoring the contents of the container as well as the exterior environment of the container, an on-board processing system comprising a signal receiving element for receiving sensor data from the sensing system, a communication systems, a memory for storing predetermined conditions, and a control element for analyzing received sensor data and declaring security alerts. Wide-spread fielding of smart container monitoring systems will require standardization and system-wide infrastructure to ensure container systems are able to communicate effectively with the remote monitoring station, data fusion centers and/or satellites.

However, given the level of complexity found in the global shipping industry in just meeting the documentation requirements of the U.S. government and the government of the importing country a smart container may be only part of the solution. Shipping companies must provide a user-friendly means of allowing controllable access to the smart container device and ensure that containers are efficiently passed through a clear chain of custody.

3. Description of Related Art

Global packaging delivery companies especially those offering a door-to door service such as UPS, DHL and FedEx focus on one basic task: delivering packages or services quickly and affordably around the globe. United Parcel Services has been using handheld electronic packaging devices since 1991. UPS' 1991 tablet was the first to capture customer signatures. The UPS Delivery Information Acquisition Device (DIAD) was an 11 by 14 inch unit with microprocessor, keypad, infrared bar code scanner, small LCD screen and an electronic signature pad for capturing customer's signatures electronically.

By 2007, UPS rolled out its fourth generation of wireless handheld computers for its 70,000 drivers. The $4^{th}$ generation DIAD powered by Microsoft Windows CE.net included built-in cellular, wireless LAN and a Bluetooth short range wireless system. It also included a GPS receiver, a bar code scanner and a color screen.

The latest handheld computer model for tracking package delivery is the FedEx MC9500. The MC9500 is an "industrial rugged device" that boasts to be the lightest, the most ergonomic, the fastest working in a 3.5 G Network with greater efficiencies in scanning and data capture. This device is touted to save FedEx from $50 million to $100 million in revenue next year. However, the cost of developing the MC9500 is an enormous investment that could only be absorbed by profitable commercial package delivery companies which can balance the costs with the long term savings.

SUMMARY OF THE PRESENT INVENTION

To address the shortcomings presented in the prior art, the present invention provides a unique apparatus that pairs a smart container monitoring system with a handheld terminal application for ensuring a secure and verifiable chain of custody, real-time asset tracking, and document management. Further, in accordance with a preferred embodiment of the present invention, the chain of custody authorization ensures that drivers, shipping agents and carriers are securely entered into the system for ensuring controllable access to a cargo container. According to one aspect of the present invention, the remote monitoring station verifies identification and licenses and oversees transferring container custody from agent to agent for each container unit. This verification may preferably include biometric parameters for authenticating an agent. Further, the present invention provides a system to manage documentation in which information from multiple sensors and multiple shipments travel and arrive with the actual shipments allowing the user to collect, view, scan, transmit and print all pertinent information pertaining to each specific shipment. The present invention may be used in conjunction with the prior art and function as a universal open architecture capable of linking to, for example, existing container sensor systems and/or shipping document management systems.

The accompanying drawings, which are incorporated in and constitute part of the specification, illustrate various embodiments of the present invention and together with the description, serve to explain the principles of the present invention.

DESCRIPTION OF THE PREFERRED EMBODIMENTS

For the purposes of promoting an understanding of the principles of the present invention, reference will now be made to the embodiments illustrated in the drawings and specific language will be used to describe the same. It will nevertheless be understood that no limitation of the scope of the present invention is hereby intended and such alterations and further modifications in the illustrated devices are contemplated as would normally occur to one, skilled in the art.

The terms "program," "computer program," "software application," and the like as used herein, are defined as a sequence of instructions designed for execution on a computer system. A program, computer program, or software application may include a subroutine, a function, a procedure, an object implementation, an executable application, an applet, a servlet, a source code, an object code, a shared library, a dynamic load library and/or other sequence of instructions designed for execution on a computer system. A data storage means, as defined herein, includes many different types of computer readable media that allow a computer to read data therefrom and that maintain the data stored for the computer to be able to read the data again. Such data storage means can include, for example, non-volatile memory, such as ROM, Flash memory, battery backed-up RAM, Disk drive memory, CD-ROM, DVD, and other permanent storage media. However, even volatile storage such a RAM, buffers, cache memory, and network circuits are contemplated to serve as such data storage means according to different embodiments of the present invention.

Figure 1:
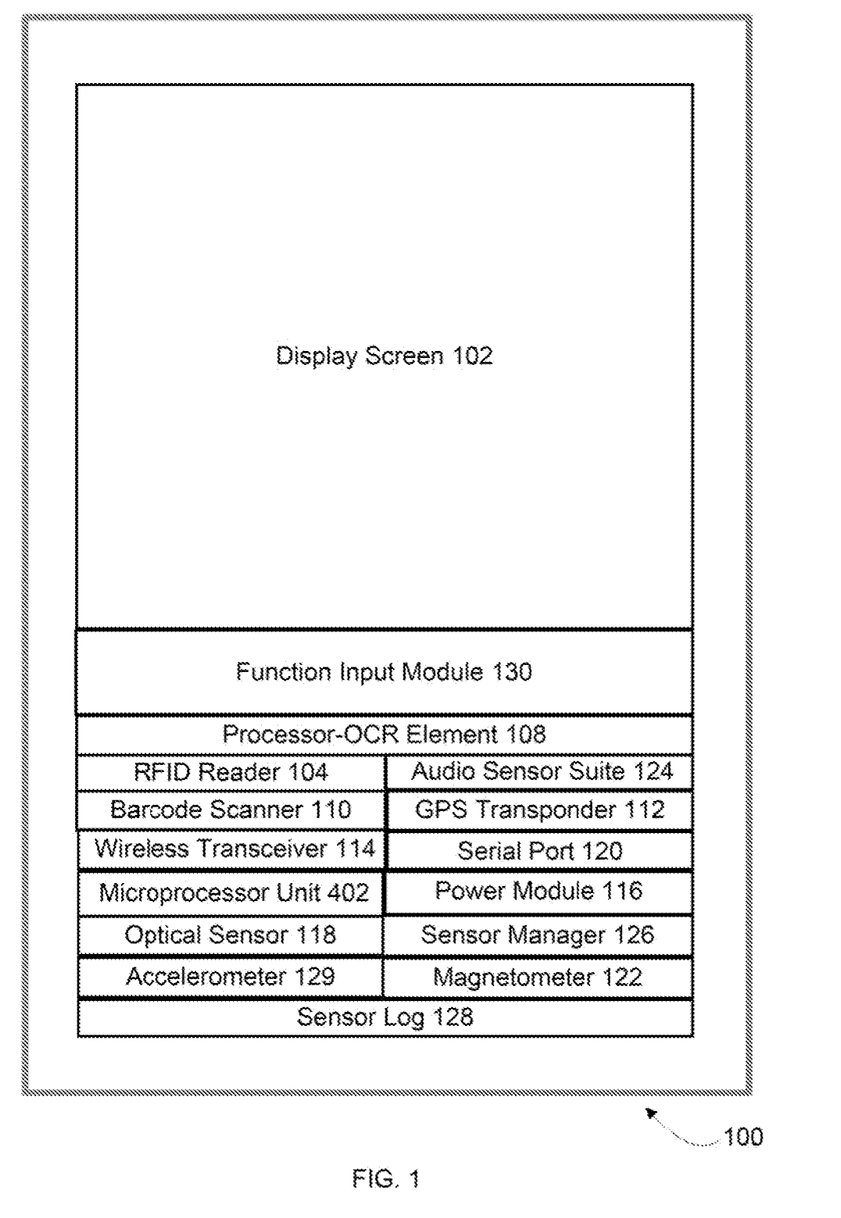
FIG. 1 shows a block diagram in accordance with an embodiment of the present invention.

With reference now to FIG. 1, a block diagram in accordance with an embodiment of the present invention will now be discussed. As shown in FIG. 1, the present invention provides a handheld terminal as a platform for pairing with a monitoring device of a cargo container or other Unit Load Device (ULD) for authorizing the carrier agent, tracking the vehicle load and managing shipping documents. According to one aspect of the present invention, the handheld terminal includes a Processor-OCR element 108, a RFID reader 104, a barcode scanner 110, a wireless transceiver element 114, serial ports 120 and a micro-processing unit 402. Preferably, the processor-OCR element 108 may include an external scanner for inputting and updating documentation. Preferably, the processor-OCR elements may be capable of recognizing and integrating any form of document regardless of the format, language and other variables. Further, the barcode scanner 110 of the present invention may access the network elements of the micro-processor 402 to run applications for Universal Barcode Identification, preferably incorporating 1D or 2D technology. Preferably, the RFID reader 104 of the present invention may be capable of querying passive, semi-passive and active RFID tag, recording the data and gathering it onto a digital manifest.

As also shown in FIG. 1, the sensing system of the present invention may include environmental sensors such as an external optical sensor module 118. According to one embodiment of the present, the external optical sensor module 118 may include biometric measuring capabilities, a motion sensing suite including a 3-axis accelerometer 120, a magnetometer 122 and an audio sensor suite 124 which may include a speakerphone, a microphone, and a receiver. Additionally, the sensing system may also include a geolocation transponder 112 which may include assisted GPS, Wi-Fi location databases, and cellular network locators. Preferably, the present invention may track shipping by package and provide real-time geolocation information accessible to the customer via a remote monitoring station.

Preferably, the present invention includes circuitry to continuously monitor the sensors and capture the highest amplitude signal over a determined, short time interval. Thereafter, as signals are detected, it is preferred that a sensor manager 126 is provided to sample the measured values or cumulative values once per programmed interval and provide the sampled results for further processing and analysis by processing system 402 of the present invention. Together the sensors of the present invention may provide continuous monitoring of environmental conditions. Preferably, each of these should be designed to be adjusted to suit particular applications. Data from these sensors is processed, stored and acted upon by the processing system of the present invention as discussed in detail below.

Displaying System

As shown in FIG. 1, the display screen 102 of the present invention preferably may be made of a durable housing, a color screen with high resolution VGA with digitizer and backlighting. Preferably, the display screen may be manipulated from the function input module 130 which may include a multitouch display, a pressure triggered stylus, an onscreen keyboard or a keypad. According to one aspect of the present invention, the display screen device may be managed and synced by a remote monitoring station.

Processing System

Figure 4:
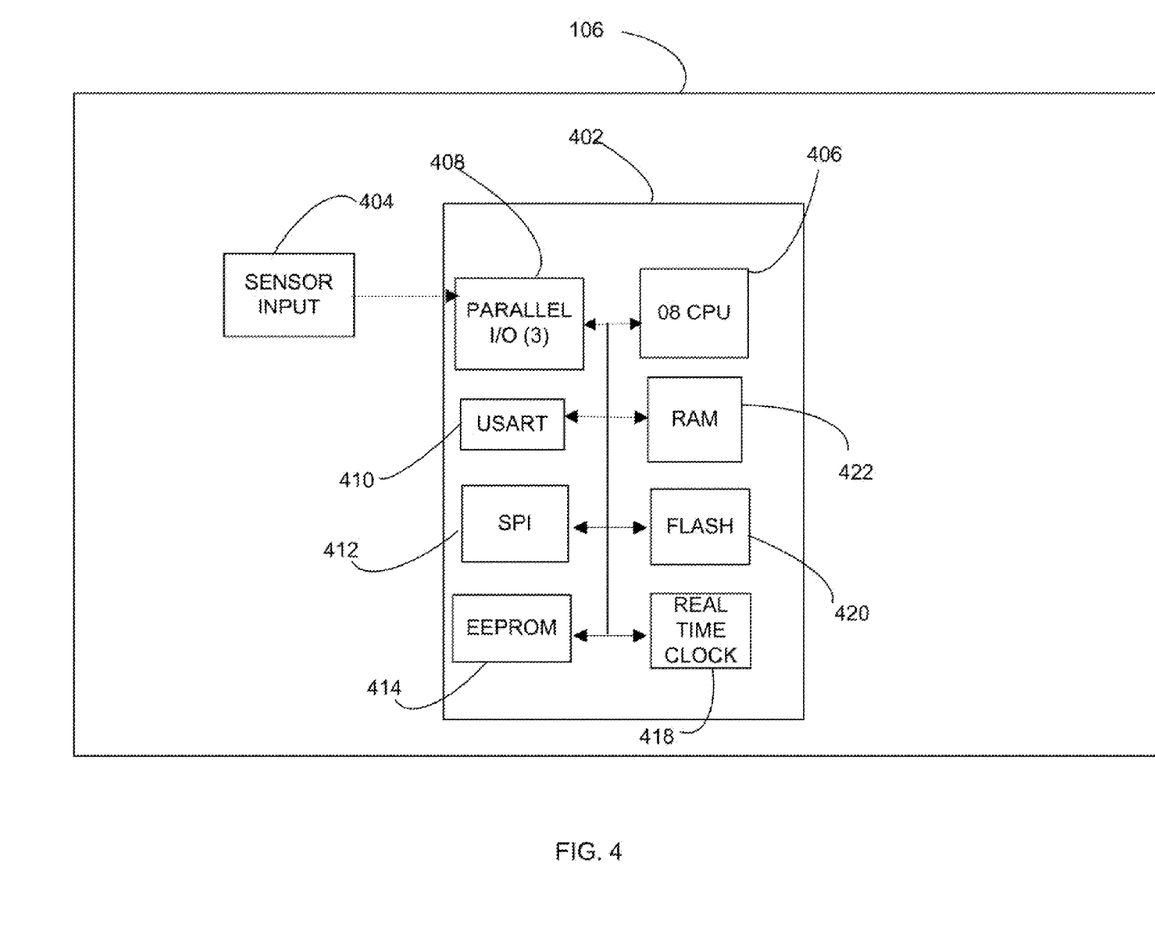
FIG. 4 shows a block diagram of a sensor control unit according to an embodiment of the present invention.

With reference now to FIG. 1 and FIG. 4, a first preferred embodiment of the processing system 402 of the present invention will now be discussed. As discussed above, it is preferable that the processing system 402 compare the sequence and threshold performance of the sensors 404 in the clusters to a set of predetermined patterns and levels derived from empirical trials on an instrumented static test container. Based on a series of rule sets stored in memory, the controller 406 then operates to declare security events and initiate recording and communication actions as programmed.

In operation, the micro-processing unit 402 is preferably programmed to routinely scan the conditions of the sensors to ensure operability. It is further preferable that the Controller Processing Unit (CPU) 406 has access to all other subsystem managers and provides control of the sensors, communications, power, and alerting functions. To achieve this function it is preferred that the controller 406 have access to and handle all of the system logging of sensor data on a sensor log 128 or similar medium.

Communication System

As further shown in FIG. 1, a wireless transceiver 114 in accordance with a preferred embodiment of the present invention may be a wireless connection in a satellite mode to communicate with a satellite system such as Globalstar or Orbcomm. Preferably, such a satellite device will be a device such as the Axxon, AutoTracker, or the like, or a customized Orbcomm VHF satellite GPS tracking communications device may be adapted with Zigbee interface antenna devices to incorporate them into the overall LAN architecture of the security system. These devices include a satellite transceiver, GPS receiver, a customized Zigbee wireless antenna with a serial (Ax Tracker) or duplex (OrbComm) interface.

In accordance with an alternative preferred embodiment of the present invention, the reporting may also be made using a wireless system independent from the satellite system. According to this embodiment, wireless signals may be transmitted to a wireless relay, base station or the like for routing and transmission to a chosen centralized location independent from or in combination with the transmissions made from the satellite system. In accordance with this alternative embodiment, signals may also be received by the communications manager and wireless interface from such external wireless networks as well.

According to a preferred embodiment of the present invention, it is preferred that the wireless communications used within the present invention will be based on the Zigbee (IEEE 802.15.4) standard. This standard transmits RF signals in the 2.4 GHz ISM band and operates with low power consumption due to its relatively slower data transmission rate (128 Kpps-250 Kbps). This approach enables additional capacity and flexibility of design through an up to 255 node pico-network. Communications are simplex or duplex in design, meaning that data can be assessed in either a push or pull process.

Remote Monitoring

To support and monitor the dataflow generated by the present invention, it is preferred that users establish a centralized location to collect and analyze data. This central location or "data fusion center" would preferably consolidate all tracking signals, sensor alarms and reports generated by the monitoring systems and provide further context and links with current intelligence.

Preferably, such a data fusion center will receive such source information in a variety of formats such as Electronic Data interchange, XML, E-mail, HTML and flat text files. After receiving such data, the data fusion center preferably would act to process information to identify anomalies. With this data collected and processed, analyst may calculate statistics and probability of detection models used for decision support.

Figure 2:
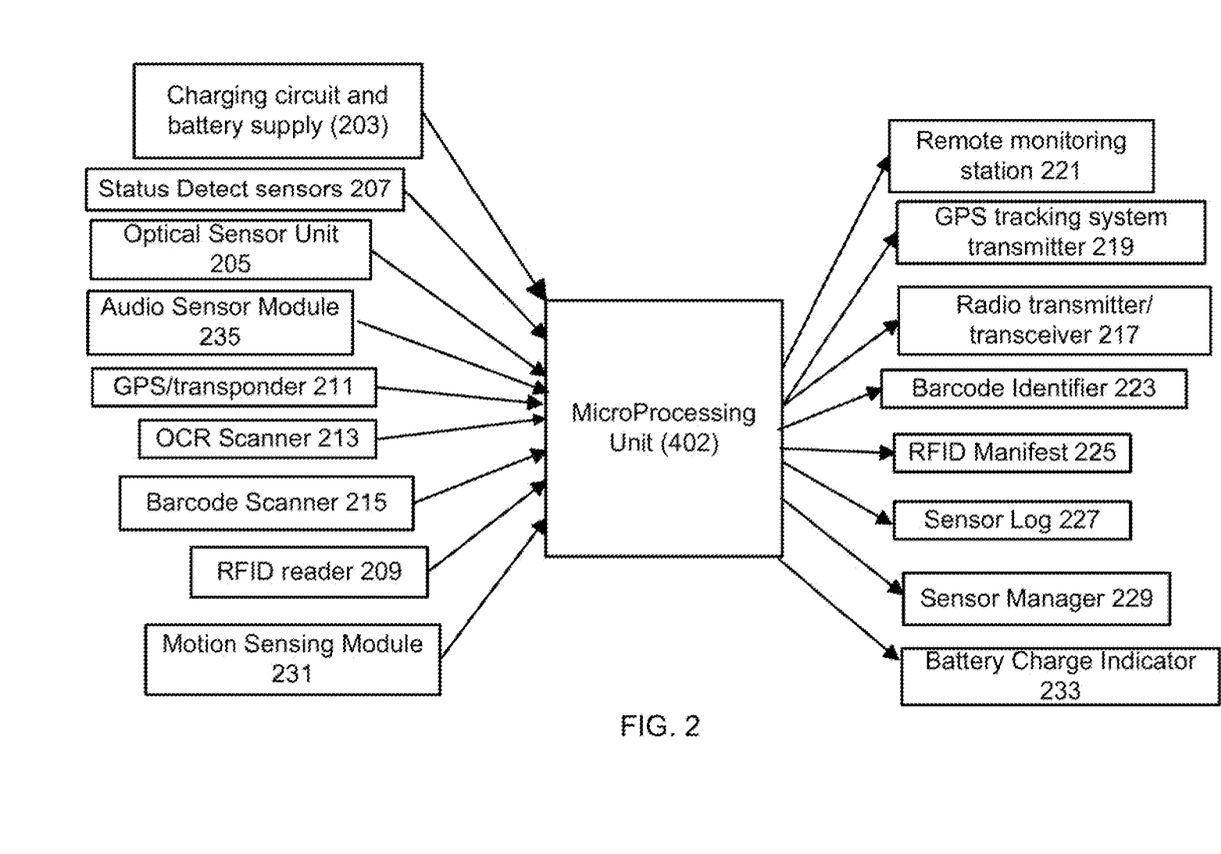
FIG. 2 shows an electrical wiring diagram according to an embodiment of the present invention.

With reference now to FIG. 2, an electrical wiring diagram of a micro-processing unit 402 according to an embodiment of the present invention will now be discussed. A micro-processing unit 402 receives input from a charging circuit and battery cells 203, an Optical Sensor unit 205, an audio sensor module 235, the status detect sensors 207, a GPS transponder 211, a motion sensing module 231 which includes an accelerometer and a magnetometer, a RFID reader 209, an OCR scanner 213 and a barcode scanner 215. The micro-processing unit 402 then assesses information and sends out signals to a radio transmitter/transceiver 217, a sensor log 227, a battery charge indicator 233, a remote monitoring station or backend server 221, a GPS tracking system transmitter 219, a bar code identifier 223, an RFID maniest 225 and a sensor manager 229. Data from these sensors is processed, stored, and acted upon by the micro-processing unit 402.

Figure 3:
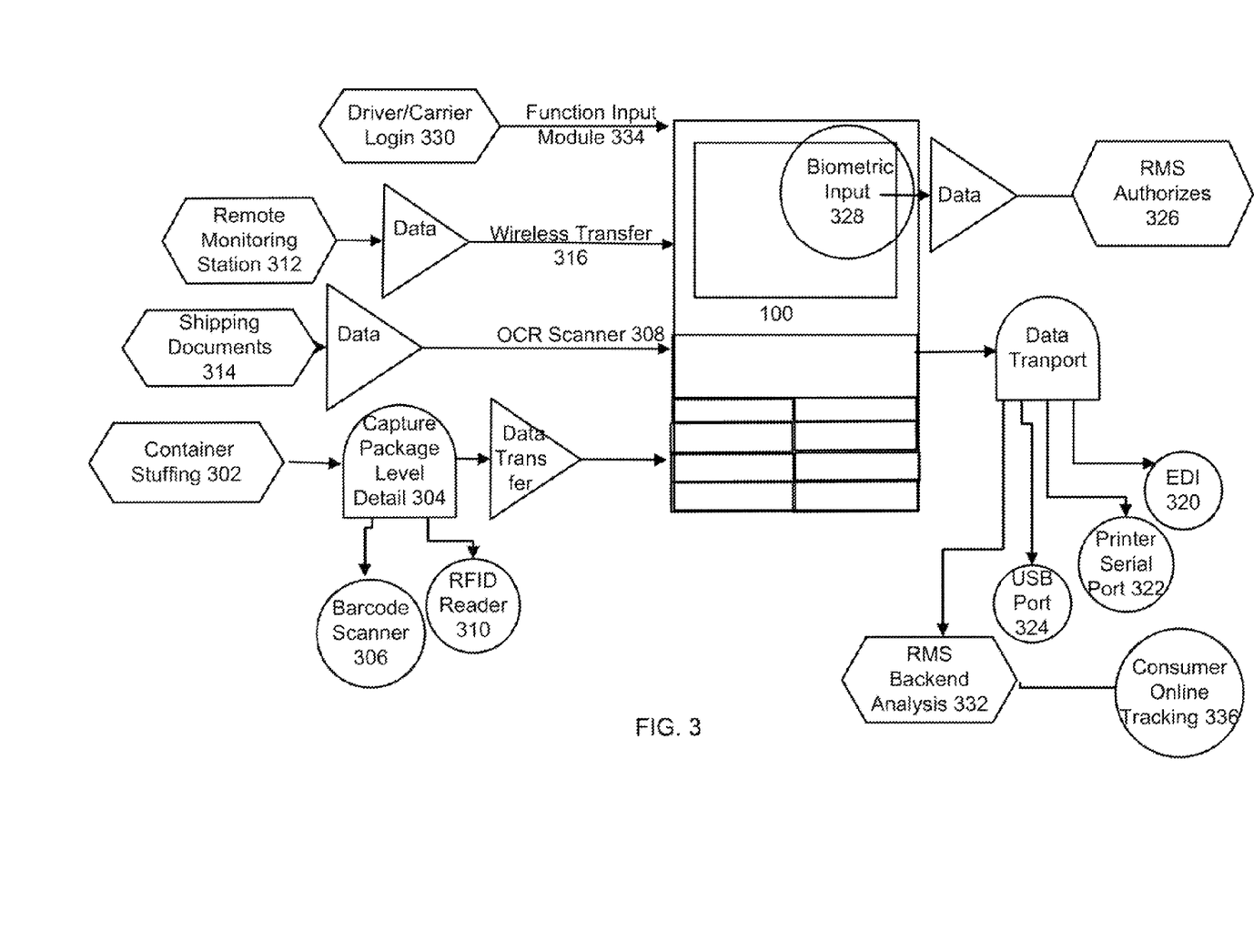
FIG. 3 shows a functional flow chart for establishing authorized chain of custody for document management with a container monitoring system in accordance with an embodiment of the present invention.

With reference now to FIG. 3, a method for pairing the present invention with a container monitoring system in accordance with an embodiment of the present invention will now be discussed. As shown in FIG. 3, a method according to a preferred embodiment of the present invention includes an initial driver or carrier log-in 330 in which an authorized agent may log-in using the function input module 334 and preferably undergo biometric security measurement 328. Preferably, the log-in data and biometric measurements are processed by the remote monitoring station for authorization 326. Upon receiving remote monitoring station authorization 326 an authorized agent may proceed with first loading containers 302 during which time it is preferred that package level detail is captured 304 by a REID reader 310 detecting RFID tags on packages and a barcode scanner 306 uploading barcodes. As container is loaded electronic manifests can be transferred via wireless document transfer 316 from the remote monitoring station 312 and/or shipping documents may be scanned 314 via the OCR Scanner 308 of the present invention. After data is transferred to the apparatus of the present invention 100, transport documents may be sorted, filed, and integrated 318 to become a unified manifest for everything on or in a pallet or container. Finally, the documentation can be managed and transferred through a USB port 324, an external serial port 322 and printer, an Electronic Data Interchange (EDI) 320 or processed by the remote monitoring station backend analyst to prepare the tracking information which may then be made accessible to the consumer or customer on-line 336.

With reference now to FIG. 4, it is preferred that the micro-processing unit 402 incorporates a microcontroller 406, a real time clock 418, a general purpose Input/Output port to support external peripheral control 408, a Universal Synchronous/Asynchronous Receiver Transmitter (USART) 410, a Serial Port Interface (SPI) 412, and memory such as RAM 422, FLASH memory 420, and EEPROM 414 as shown.

Preferably, the controller 406 used may be a low power, high performance, eight-bit intergrated circuit based on the Motorola HCS08 instruction set. The micro-processor 402 will preferably manage power and host the master date-time clock, communication scheduling and annotation of flash memory records.

Preferably, the present invention includes circuitry and digital ports to connect to existing electrical and sensor management systems previously configured with embedded circuitry. In operation, a controller unit 406 is preferably programmed to routinely scan the condition of each sensor to ensure operability.

Figure 5:
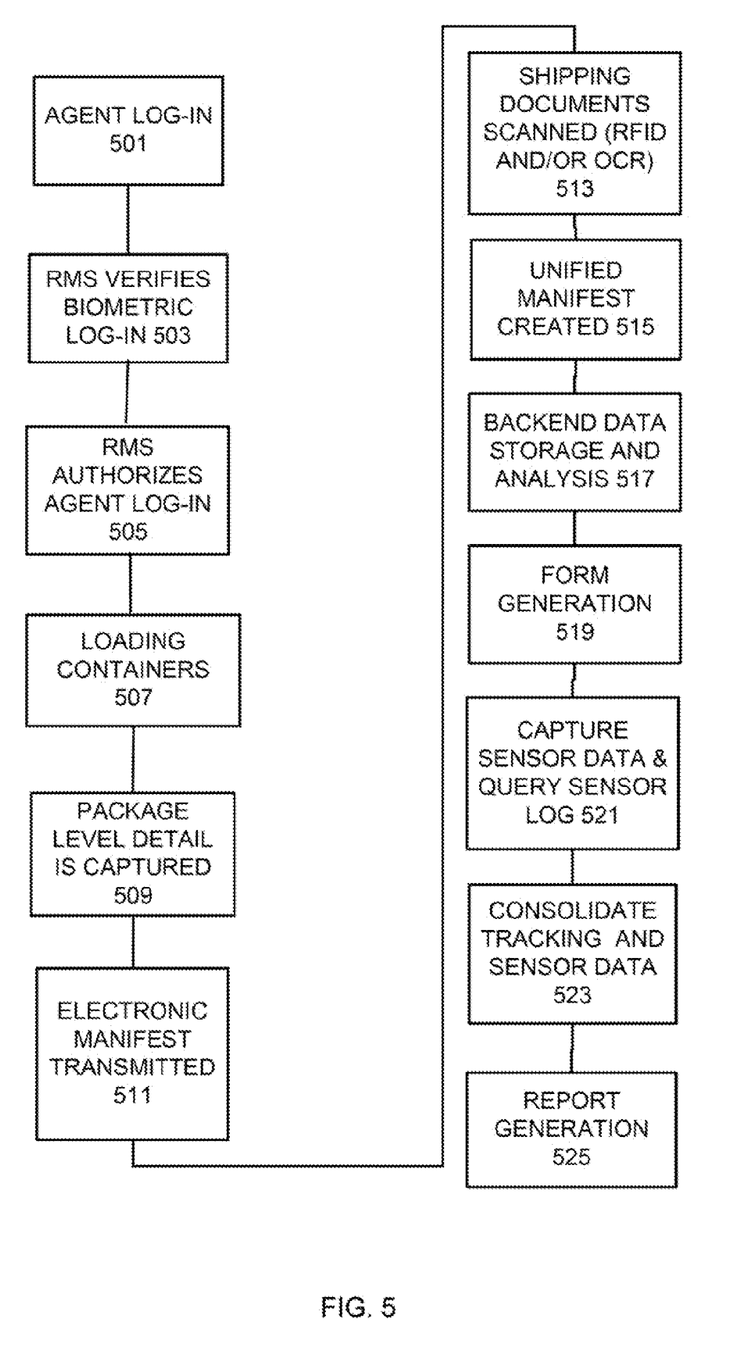
FIG. 5 shows a method for establishing an authorized chain of custody for tracking assets and document management within a container monitoring system in accordance with an embodiment of the present invention.

With reference now to FIG. 5, a method for establishing an authorized chain of custody for tracking assets and document management within a smart container monitoring system in accordance with an embodiment of the present invention will now be discussed. As shown in FIG. 5, a method according to a preferred embodiment of the present invention includes an initial driver or carrier log-in 501 in which an authorized agent may log-in using the function input module and preferably undergo biometric security measurement 503. Preferably, the log-in data and biometric measurements are processed by the remote monitoring station for authorization 505. Once an agent is authorized access, the shipping container is loaded 507 and the present invention captures package level detail 509. Preferably, an electronic manifest is wirelessly transferred and received by the processing unit of the present invention 511 or a copy of the manifest and/or other shipping documents may be manually uploaded by the OCR scanner of the processing unit 513. Preferably, according to one aspect of the present invention, the package level detail captured at loading can be reconciled to the shipping manifest. In accordance with the present invention, a unified manifest may be generated 515 and transmitted for backend data storage and analysis 517. In transit and especially at custom points, according to one aspect of the present invention, forms may be generated as needed by authorities 519. Documentation may be delivered in complete, viewable, and organized shipping documentation folders and transferred through a USB port, an external serial port and printer and/or Electronic Data Interchange (EDI). Preferably, in accordance with one aspect of the present invention, sensor data may be captured and the sensor log queried 521 by either the local user or the remote monitoring station. Preferably, tracking and sensor data may be consolidated with shipping documents 523 for generating complete tracking logs and other reports 525 based on actual sensor data collected during transit.

While the above descriptions regarding the present invention contain much specificity, these should not be construed as limitations on the scope, but rather as examples. Many other variations are possible. Accordingly, the scope should be determined not by the embodiments illustrated, but by the appended claims and their legal equivalents.

What is claimed is:

1. An apparatus for tracking assets and managing transport documents, the apparatus comprising:
    a transceiver element, wherein the transceiver element is configured to transmit and receive data based on agent identification information, container data and shipping information;
    a communication element for requesting access and receiving authorization for accessing a secure container;
    an RFID reader configured to capture package level data of the secure container;
    at least one sensor for identifying agents;
    a processing element configured to receive electronic manifest data, wherein the electronic manifest data includes data regarding the identity of the shipping container, routing information and custody of the container contents; wherein the processing element is further configured to create a unified manifest including electronic manifest data and package level data; and further wherein the processing system further includes an OCR processing element;
    and further wherein the processing element is further configured to consolidate sensor data with data from the unified manifest;
    a form generating element, wherein the form generating element is configured to generate and populate forms with data from the unified manifest; wherein the form generating element is further configured to generate a tracking data report which includes sensor data and data from the unified manifest;
    and further wherein the form generating element is further configured to generate forms using data from the unified manifest including package level data and geolocation data to identify and populate one or more forms required for international shipping;
    a sensing system, wherein the sensing system is comprised of at least one sensor which is configured to capture sensor data and further wherein the sensing system comprises at least one environmental sensor selected from the group of environmental sensors which includes: an accelerator, a magnetometer, and an optical sensor;
    a display screen system for user level interaction;
    a geolocation transponder for providing geolocation information to the processing system, wherein the geolocation transponder is selected from the group of geolocation transponders which includes: global positioning system, Wi-Fi location databases, and cellular network locator.

2. The apparatus of claim 1, wherein the apparatus further comprises an open architecture processing and control system for communicating with existing container sensor systems.

3. The apparatus of claim 2, wherein the unified manifest data includes data regarding at least one shipping document selected from the following group of shipping documents: air freight waybills, an ocean waybill, a bill of lading, a straight bill of lading, a shipper's order bill of lading, a proof of ownership, a commercial invoice, a bill for the goods, a consular invoice, a certificate of origin, a NAFTA certificate of origin, an inspection certification, a dock receipt, a warehouse receipt, a destination control statement, a Shipper's Export Declaration (SED), a Shipper's Letter of Instructions, an export license, an export packing list, or an insurance certificate.

4. The apparatus of claim 3, wherein the form generating element is configured to prepare forms based on the content, copies and/or language required by the importing government.

5. The apparatus of claim 4, wherein the form generating element is configured to prepare forms based on the detected geolocation.

6. The apparatus of claim 5, wherein at least one sensor for identifying agents is configured to take biometric measurements.

* * * * *